(12) United States Patent
Hendel et al.

(10) Patent No.: US 10,279,622 B2
(45) Date of Patent: May 7, 2019

(54) COMPOSITE WHEEL WITH REINFORCED CORE

(71) Applicants: Tomer Hendel, Santa Monica, CA (US); Guy Hendel, Santa Monica, CA (US)

(72) Inventors: Tomer Hendel, Santa Monica, CA (US); Guy Hendel, Santa Monica, CA (US)

( * ) Notice: Subject to any disclaimer, the term of this patent is extended or adjusted under 35 U.S.C. 154(b) by 0 days.

(21) Appl. No.: 14/314,024

(22) Filed: Jun. 24, 2014

(65) Prior Publication Data

US 2015/0367676 A1 Dec. 24, 2015
US 2019/0084346 A9 Mar. 21, 2019

Related U.S. Application Data

(60) Division of application No. 13/228,383, filed on Sep. 8, 2011, now Pat. No. 8,783,789, which is a continuation-in-part of application No. 12/582,709, filed on Oct. 21, 2009, now abandoned, which is a continuation-in-part of application No. 12/315,595, filed on Dec. 4, 2008, now abandoned.

(51) Int. Cl.
*B60B 3/10* (2006.01)
*B60B 3/12* (2006.01)
*B60B 3/02* (2006.01)
*B60B 5/02* (2006.01)

(52) U.S. Cl.
CPC .................. *B60B 3/12* (2013.01); *B60B 3/02* (2013.01); *B60B 3/10* (2013.01); *B60B 5/02* (2013.01); *B60B 2360/364* (2013.01)

(58) Field of Classification Search
CPC .... B60B 3/12; B60B 3/02; B60B 3/10; B60B 3/00; B60B 5/02; B60B 5/00; B60B 2360/30; B60B 2360/36; B60B 2360/364
See application file for complete search history.

(56) References Cited

U.S. PATENT DOCUMENTS

| | | | | | |
|---|---|---|---|---|---|
| 3,790,219 | A | * | 2/1974 | Watts | B60B 3/08 301/64.306 |
| 3,811,737 | A | * | 5/1974 | Lejeune | B60B 3/16 301/35.632 |
| 4,173,992 | A | * | 11/1979 | Lejeune | B60B 5/02 152/381.3 |
| 4,230,332 | A | * | 10/1980 | Porsche | B62J 99/00 280/274 |
| 4,252,378 | A | * | 2/1981 | DeBolt | B60B 5/02 264/DIG. 6 |
| 4,294,639 | A | * | 10/1981 | Woelfel | B29C 53/60 156/185 |
| 4,376,749 | A | * | 3/1983 | Woelfel | B29C 53/60 156/184 |
| 4,532,097 | A | * | 7/1985 | Daniels | B29C 70/081 264/258 |
| 4,583,933 | A | * | 4/1986 | Woelfel | B29C 53/60 249/56 |

(Continued)

*Primary Examiner* — James M Dolak
(74) *Attorney, Agent, or Firm* — One LLP; Jonathan Jaech

(57) ABSTRACT

A one-piece composite wheel has a disc core made from a three-dimensionally reinforced honeycomb structure, with the disc core embedded by a composite material to form a disc section of the wheel. The composite material also forms the rim of the wheel, with the rim being integral with the disc section.

19 Claims, 9 Drawing Sheets

(56) References Cited

U.S. PATENT DOCUMENTS

| | | | | |
|---|---|---|---|---|
| 4,749,235 A * | 6/1988 | McDougall | ............... | B60B 5/02 |
| | | | | 301/64.703 |
| 4,927,347 A * | 5/1990 | Golata | .................... | B29C 33/22 |
| | | | | 249/161 |
| 5,277,479 A * | 1/1994 | Koyama | ................... | B60B 5/02 |
| | | | | 301/6.91 |
| 6,736,463 B2 * | 5/2004 | Bazzoni | .................... | B60B 3/08 |
| | | | | 301/64.306 |
| 6,926,370 B2 * | 8/2005 | Spoelstra | ............... | B29C 70/48 |
| | | | | 301/64.703 |
| 7,114,785 B2 * | 10/2006 | Ording | ................... | B60B 3/007 |
| | | | | 244/130 |
| 8,662,599 B2 * | 3/2014 | Liao | ........................ | B60B 5/02 |
| | | | | 301/63.101 |
| 8,783,789 B2 * | 7/2014 | Hendel | .................... | B60B 1/06 |
| | | | | 301/64.702 |
| 9,815,323 B2 * | 11/2017 | Chenault, III | ............ | B60B 3/06 |
| 9,840,110 B2 * | 12/2017 | Dingle | ...................... | B32B 3/02 |
| 9,969,209 B2 * | 5/2018 | Quiroz | ..................... | B60B 5/02 |
| 9,981,428 B2 * | 5/2018 | Shimoda | ................ | B29C 70/32 |
| 10,005,245 B2 * | 6/2018 | Lin | ....................... | B29C 70/545 |
| 10,029,512 B2 * | 7/2018 | Snyder | .................... | B32B 3/26 |
| 10,065,450 B2 * | 9/2018 | Righini | ................... | B60B 1/003 |

\* cited by examiner

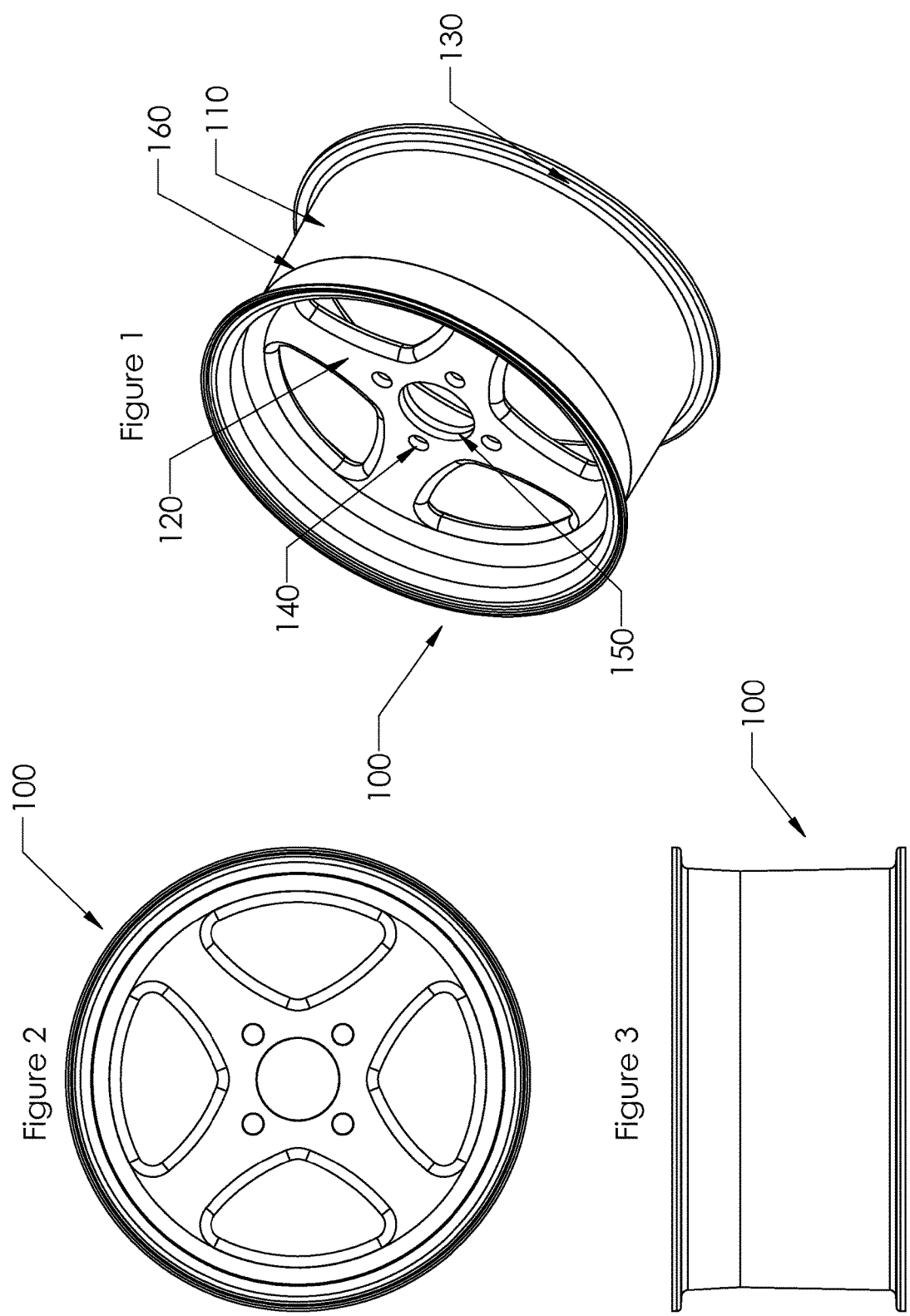

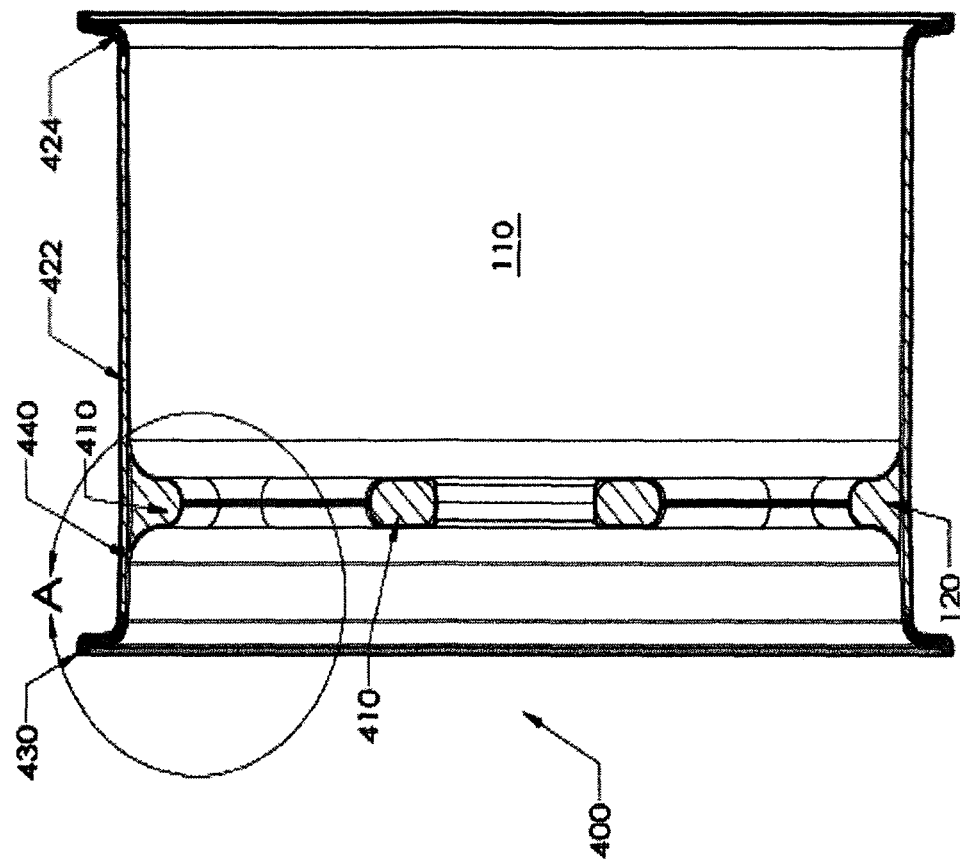
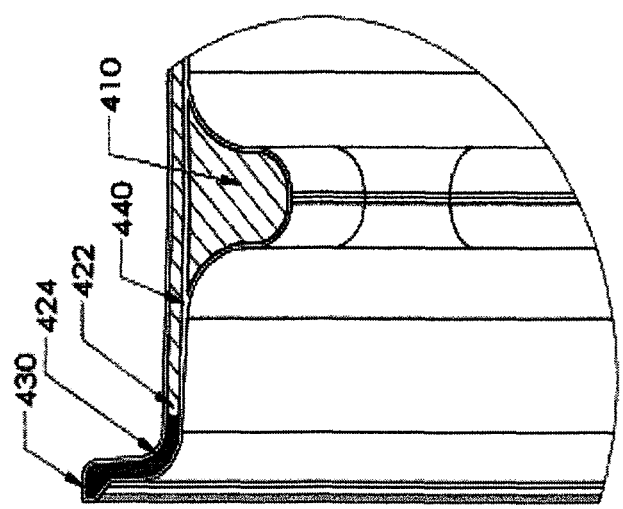

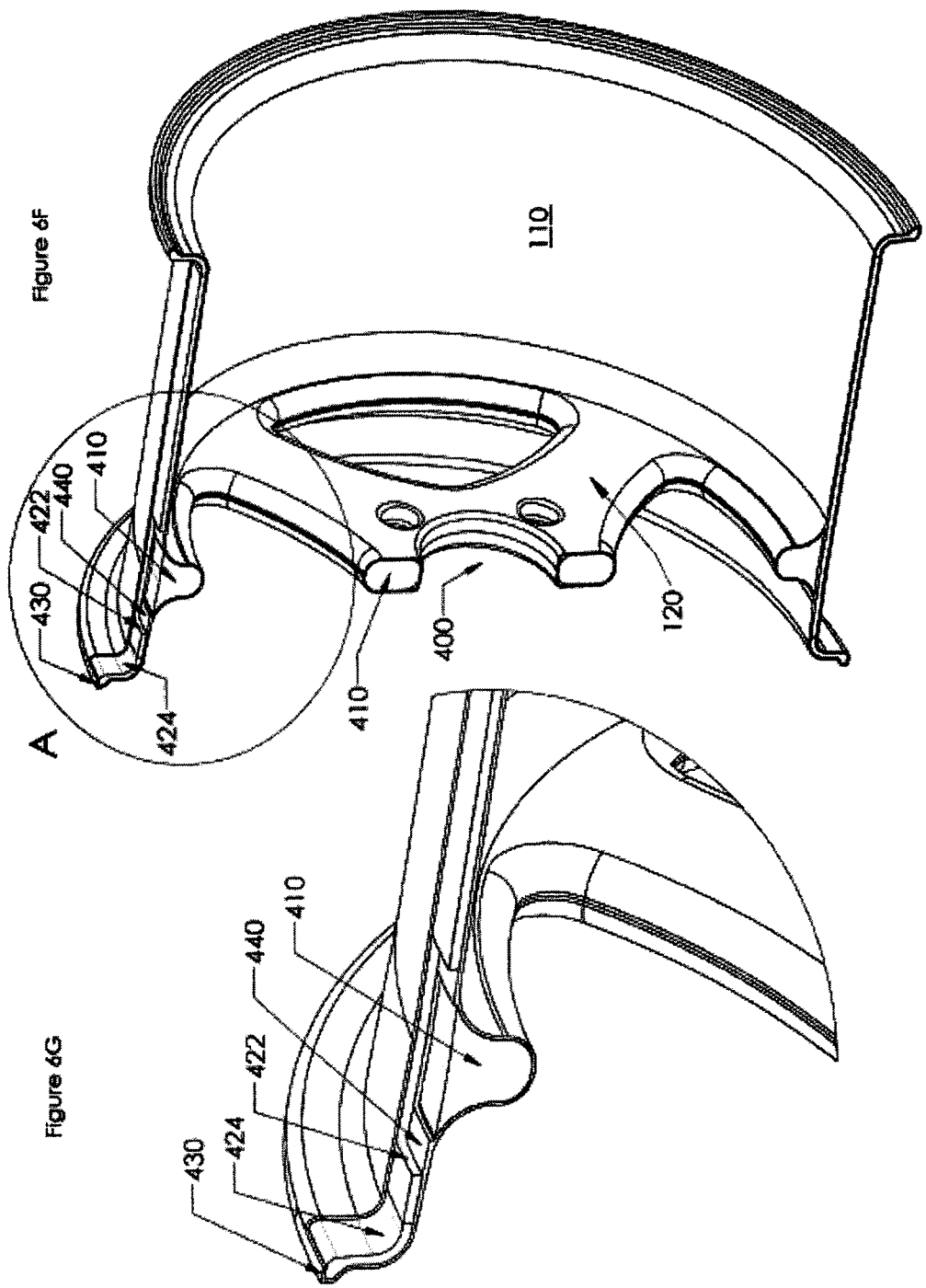

COMPOSITE WHEEL WITH REINFORCED CORE

RELATED APPLICATIONS

This application is a divisional application of U.S. patent application Ser. No. 13/228,383, filed on Sep. 8, 2011, entitled "Composite Wheel with Reinforced Core", which is a continuation-in-part of U.S. patent application Ser. No. 12/582,709 filed Oct. 21, 2009, entitled "Composite Wheel with Reinforced Core"; which is a continuation-in-part of U.S. patent application Ser. No. 12/315,595 filed Dec. 4, 2008, entitled "Composite Wheel With 3-Dimensional Core"; both of which are hereby incorporated by reference for all purposes.

BACKGROUND OF THE DISCLOSURE

The present invention relates to the design and manufacture of a composite wheel. Composite materials have been utilized for their advantage of being lighter in weight than conventional metal wheels. As such, the ability to increase the strength of composite materials through the use of various resins, fibers, and configurations of laying out the fibers has been one area of development in the field of composite wheels.

In addition, manufacturing processes to make composite wheels cost-effective to produce is another area of development. Composite wheels are typically made from two main pieces. For example, the wheel may be split vertically so that a first piece (e.g., "street side" half) is joined to a second piece (e.g., "drum side" half). In other examples, the wheel is made of a central disc portion joined to a second rim or ring piece forming the circumference of the wheel. Two-piece wheels may be joined, for example, by metal bolts and adhesives, and may require the use of additional components such as sleeves and collars to assist in aligning and securing the parts together.

There remains a continued need for lightweight, composite wheels with increased strength and improved manufacturability.

SUMMARY OF THE DISCLOSURE

The present disclosure describes a one-piece composite wheel. The wheel has a disc core made from a three-dimensionally reinforced honeycomb structure, with the disc core embedded by a composite material to form a disc section of the wheel. The composite material also forms the rim of the wheel, with the rim being integral with the disc section.

BRIEF DESCRIPTION OF THE DRAWINGS

Reference now will be made in detail to embodiments of the disclosed invention, one or more examples of which are illustrated in the accompanying drawings.

FIG. 1 illustrates a perspective view of an embodiment of the present invention;

FIG. 2 is a front view of the wheel of FIG. 1;

FIG. 3 is a side view of the wheel of FIG. 1;

FIG. 6C illustrates a cross-sectional view of another embodiment of a wheel of the present invention;

FIG. 6D provides a detailed view of section A of FIG. 6C;

FIG. 6F shows a cut-away isometric view of the wheel of FIG. 6C;

FIG. 6G shows a detailed view of section A of FIG. 6F;

DETAILED DESCRIPTION OF THE EMBODIMENTS

Figure 4:
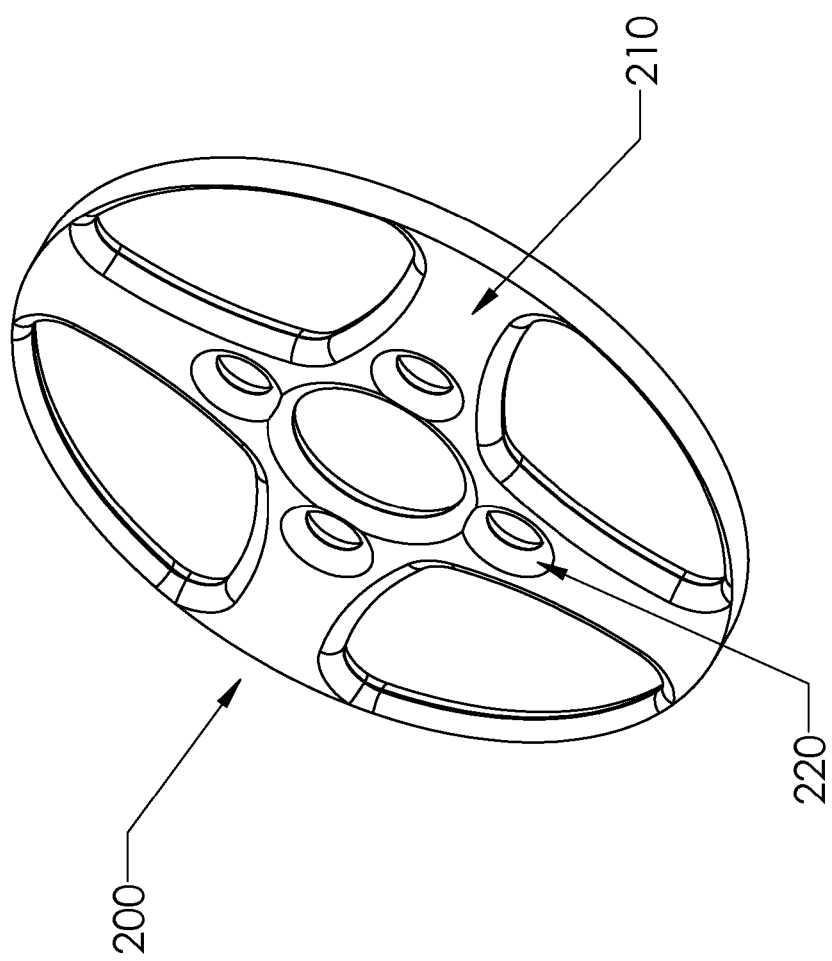
FIG. 4 depicts a perspective view of an exemplary disc core of the present invention.

Composite materials have been used in wheels as a means to decrease weight and consequently improve performance. The present disclosure describes a one-piece composite wheel having a reinforced core. The reinforced core advantageously reduces weight while improving strength. The one-piece design offers the ability to decrease manufacturing cost at mass production levels through reducing the number of parts compared to composite wheels known in the art.

FIGS. 1, 2, and 3 illustrate perspective, front, and side views respectively of an exemplary wheel 100 of the present invention. FIG. 1 describes various portions of the wheel 100, including ran 110, disc 120, head seat 130, lug nut holes 140, axle hole 150, and drop center 160. Rim 110 is the portion of the wheel to which a tire is mounted, and includes bead seat 130 around the outer ring portion of rim 110, and drop center 160. The bead seat 130 serves to position and seal the lire on the wheel, and the bead seats on the edges of the wheel are typically referred to as the inner bead seat and outer head seat. The rim 110 has a width spanning from the inner to the outer bead seats 130. While drop center 160 is illustrated in FIGS. 1 and 3 as relatively level with the rest of rim 110, drop center 160 may also be recessed as known in the art to assist with tire mounting and to reduce weight. Disc 120 is the central portion of wheel 100 that enables the wheel 100 to be mounted onto a vehicle via lug nut holes 140 and axle hole 150 in the hub section. Note that the shape of disc 120 throughout this disclosure is merely representative of the possible shapes. For example, disc 120 may have more or less than the four spokes shown, may be a solid circular plate, or may have a different number of lug nut holes 140 and with alternate placing than what is shown. As shall be described subsequently in relation, to manufacturing processes, rim 110 and disc 120 of the wheel 100 are formed integrally as one piece with an embedded disc core. Such a one-piece construction beneficially offers reduction of manufacturing costs at mass production levels by reducing the need for fasteners, sleeves, or other components as are required with two-piece wheel designs.

FIG. 4 illustrates an exemplary disc core 200 for embedding within the composite wheel 100 of FIG. 1. Wheel 100 is fabricated from a composite material, such as but not limited to carbon fiber, fiberglass, or aramid fibers layered around the disc core 200. Disc core 200 is constructed from a three-dimensionally reinforced material, which advantageously offers improved wheel strength while reducing weight. The composite material is layered onto disc core 200 to embed disc core 200. In some embodiments the composite material may be the only material required to embed disc core 200 due to the high strength provided by the three-dimensionally reinforced disc core 200. As the composite material is layered over disc core 200, it may be laid out to also integrally form a rim 110 for wheel 100. The shape of disc core 200 corresponds to the shape and features of disc 120, such as the spokes 210 and lag nut holes 220 in the hub area. Disc core 200 extends across the diameter of the wheel's disc section, providing structural support for the disc's features such as the spokes 210. Disc core 200 may be machined into shape by, for example, water jet cutting and conventional machining methods. Specific dimensions of disc core 200 relative to the overall dimensions of disc 120 are based on the strengths and properties of the particular materials used (e.g., core, composite fiber and resin) as well as on the specific wheel design. Dimensions may be calculated using finite element modeling or other appropriate analysis methods known in the art. The overall size of disc core 200 depends on the specific application, but may in typical scenarios vary from three inches in diameter to larger than ten feet, as could be the ease in heavy construction equipment applications. However, there are no size limitations except as required by a particular application. The thickness of a three-dimensional honeycomb core varies similarly based on the particular application, with a sample range encompassing $1/16^{th}$ of an inch to several feet.

Figure 5:
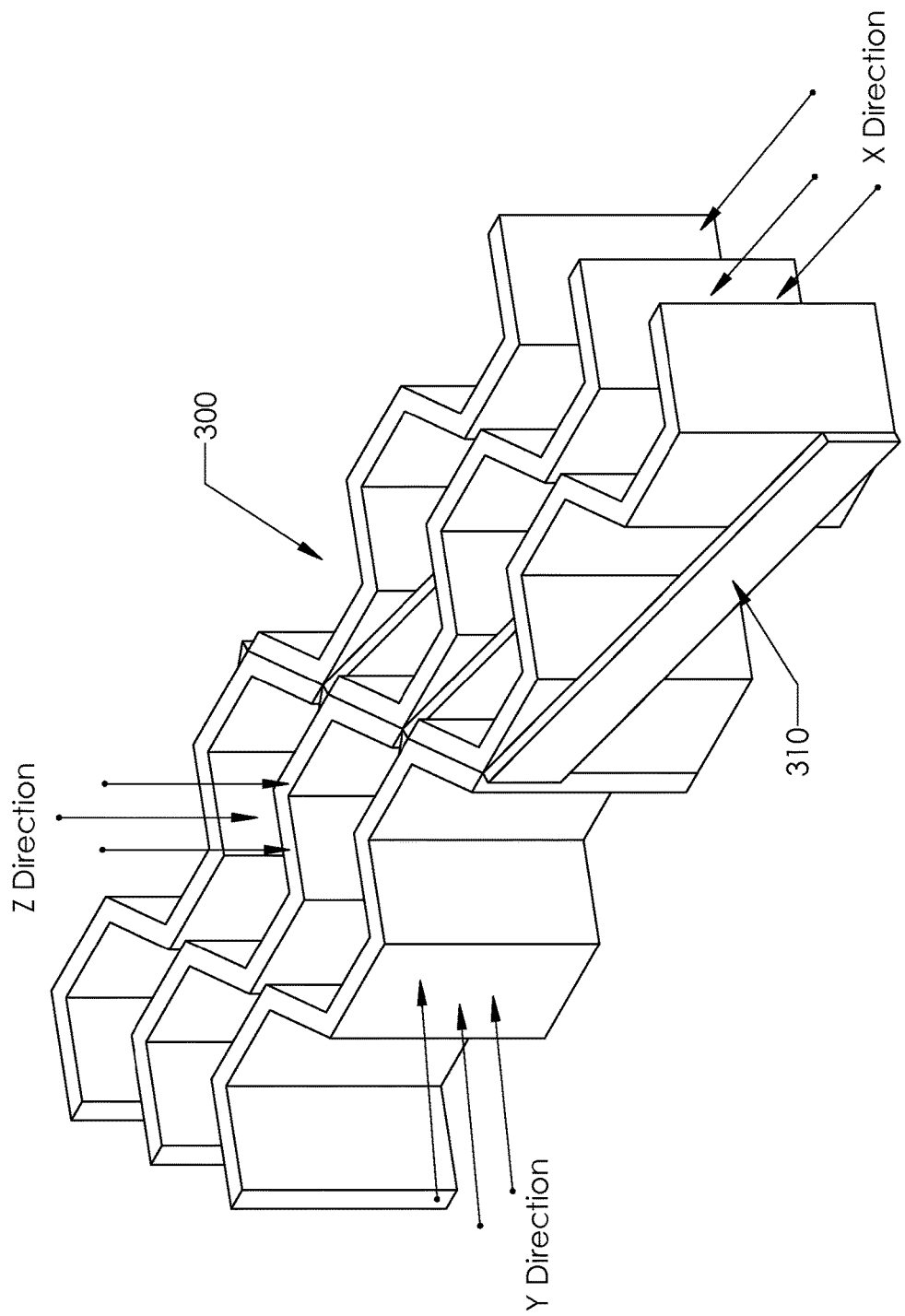
FIG. 5 provides a detailed perspective view of an exemplary reinforced honeycomb structure.

FIG. 5 provides detailed structure of an exemplary reinforced material 300 for disc core 200. In the embodiment of FIG. 5, material 300 is a honeycomb-type, structure reinforced in three dimensions. While a standard honeycomb offers resistance in the Z-direction, the reinforced honeycomb structure of FIG. 5 incorporates cross-beams 310 which provide load resistance in the X- and Y-directions. Such an isotropic structural material embedded within the wheel 100 adds strength and stiffness with a minimum of increased weight. Other honeycomb-type structures that are reinforced in three dimensions may also be used as a core material. In one embodiment, the disc core 200 may be made of Trussgrid™ three-dimensional honeycomb material and may be aluminum. In other embodiments, the disc core 200 may be made from titanium, plastic, wood, foam, or any material with sufficient strength and weight, advantage.

Returning to FIG. 2, optional lug nut inserts (not shown) to prevent crushing of the core material may be inserted into lug nut holes 220, such as directly onto the disc core 200 during layering with composite material, or onto the finished wheel. Lug nut inserts may be made of, for example, aluminum, steel or fiberglass laminate, and may be embedded in or bonded to the wheel. Similarly, inserts for axle hole 150 of FIG. 1 may also be utilized.

Figure 6A:
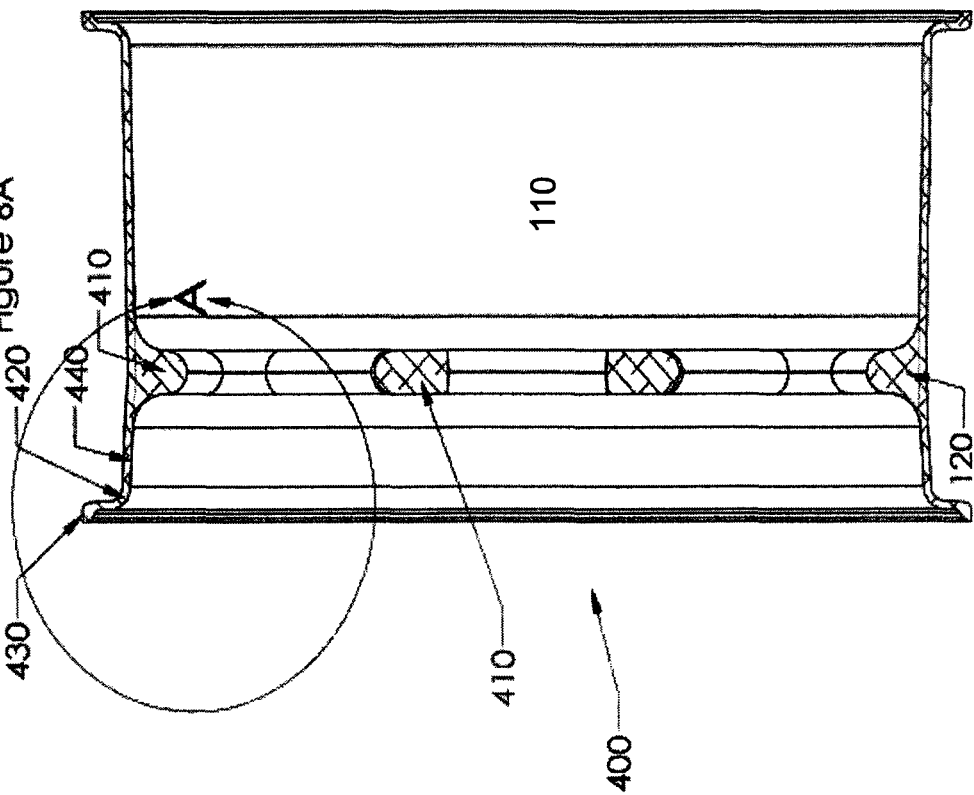
FIG. 6A illustrates a cross-sectional view of one embodiment of a wheel of the present invention.
Figure 6B:
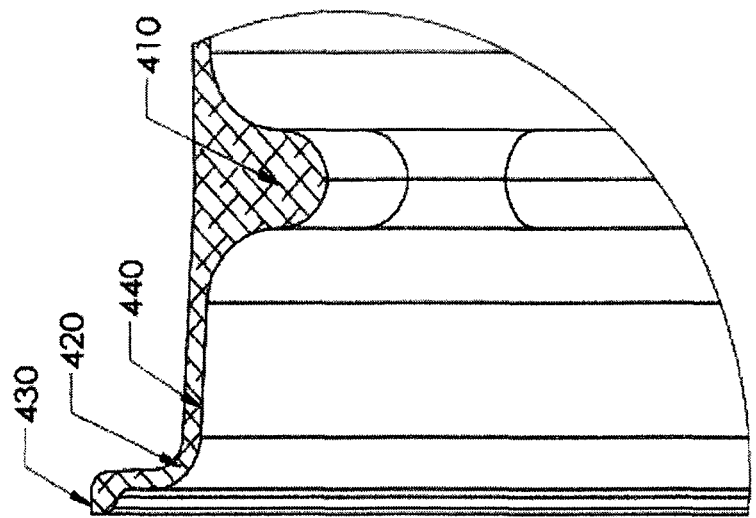
FIG. 6B provides a detailed view of section A of FIG. 6A.

In addition to an embedded disc core 200, the wheel of the present invention may optionally include an embedded rim core. A rim core may further reduce the weight of the wheel by replacing layers of composite fiber, compared to a rim formed from only composite fibers as described above. FIG. 6A depicts a cross-section taken vertically through a non-spoke diameter of an exemplary wheel 400. FIG. 6B provides a close-up view of section A in FIG. 6A. In FIG. 6A both a disc core 410 and a rim core 420 can be seen, and disc core 410 and rim core 420 are one integral piece. The one-piece integral disc core 410 and rim core 420 may be placed in a mold and then layered with fibers over it.

In other embodiments, for example as shown in FIGS. 6C and 6D, disc core 410 may be a separate piece from rim core 420. In the two-piece core embodiment of FIGS. 6C and 6D, disc core 410 comprises the central portion of the wheel, as for example shown by disc core 200 of FIG. 4. Rim core 420 (shown as a flat portion 422 and a bead seat insert 424, which may be a single piece or two separate as will be described subsequently) comprises the cylindrical portion surrounding the disc core 410, as exemplified by rim core 695 of FIG. 8. The disc core 410 and the rim core 420 may each be layered with carbon fiber individually or together as one unit. For example, the disc core 410 may be wrapped with carbon fiber, then more carbon fiber layers may be overlapped on the rim section, and then the rim core 420 (the combination of the flat portion 422 and the bead set insert 424) placed around the assembly and applied with additional carbon fiber to form outer layers of the wheel.

Figure 6I:
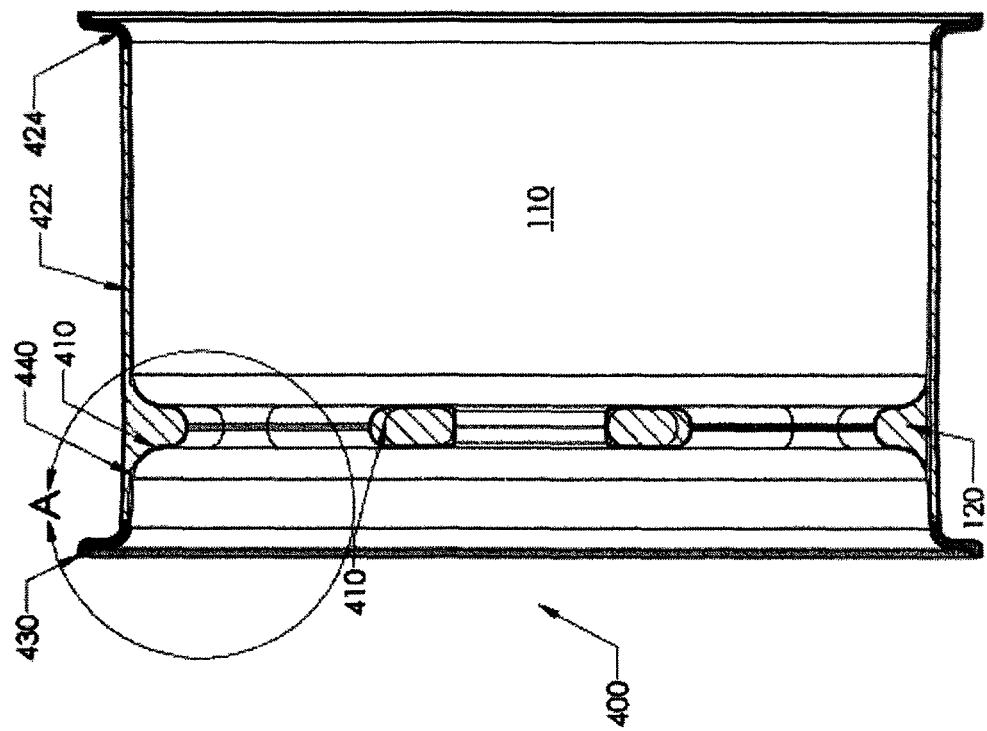
FIGS. 6H and 6I illustrate a cross-sectional view of yet another embodiment of a wheel of the present invention.
Figure 6H:
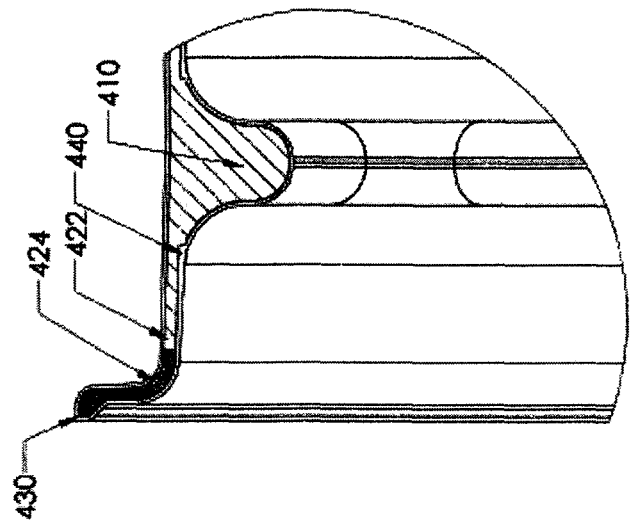

In yet other embodiments, rim core 420 itself may be comprised of individual components. For instance, as shown in the embodiment of FIGS. 6C and 6D, rim core 420 may include one piece for the flat portion 422 and another piece within the bead seat insert 424. FIGS. 6F and 6G provide isometric views of the embodiment of FIGS. 6C and 6D, including cut-away views of the various composite material and core layers. In this example, the component for the bead seat insert 424 of the rim core 420 incorporates a curved area where a tire will be positioned, and continues to the outer edge of the rim 110. The component for the flat portion 422 of the rim core 420 extends through the flat portion of the rim 110. Note that in other embodiments, the flat portion 422 may be contoured to have a drop center that has a smaller diameter than the edges of the rim 110, as needed for a specific wheel design. Furthermore, while the two bead seat inserts 424 of FIG. 6C are shown as symmetrical, in other embodiments they may be non-symmetrical as desired by the specific design requirements. Reference numbers 430 and 440 identify outer and inner composite material, respectively, layered around rim core 420. Although not shown in detail, disc core 410 is similarly embedded between inner and outer layers of composite material, such as a fiber-reinforced resin. In other embodiments, bead seat insert 424 may be used as a bead seat insert for a rim 110 which is fabricated only of composite material for the ring portion of the rim 110. That is, bead seat insert 424 may be used as a core piece in a composite wheel, independent of the core for flat portion 422. In another example shown in FIGS. 6H and 6I, the disc core 410 and flat portion 422 are integral with each other, while the bead seat insert 424 is a separate piece from the combined disc 120 and rim core 420.

Figure 7:
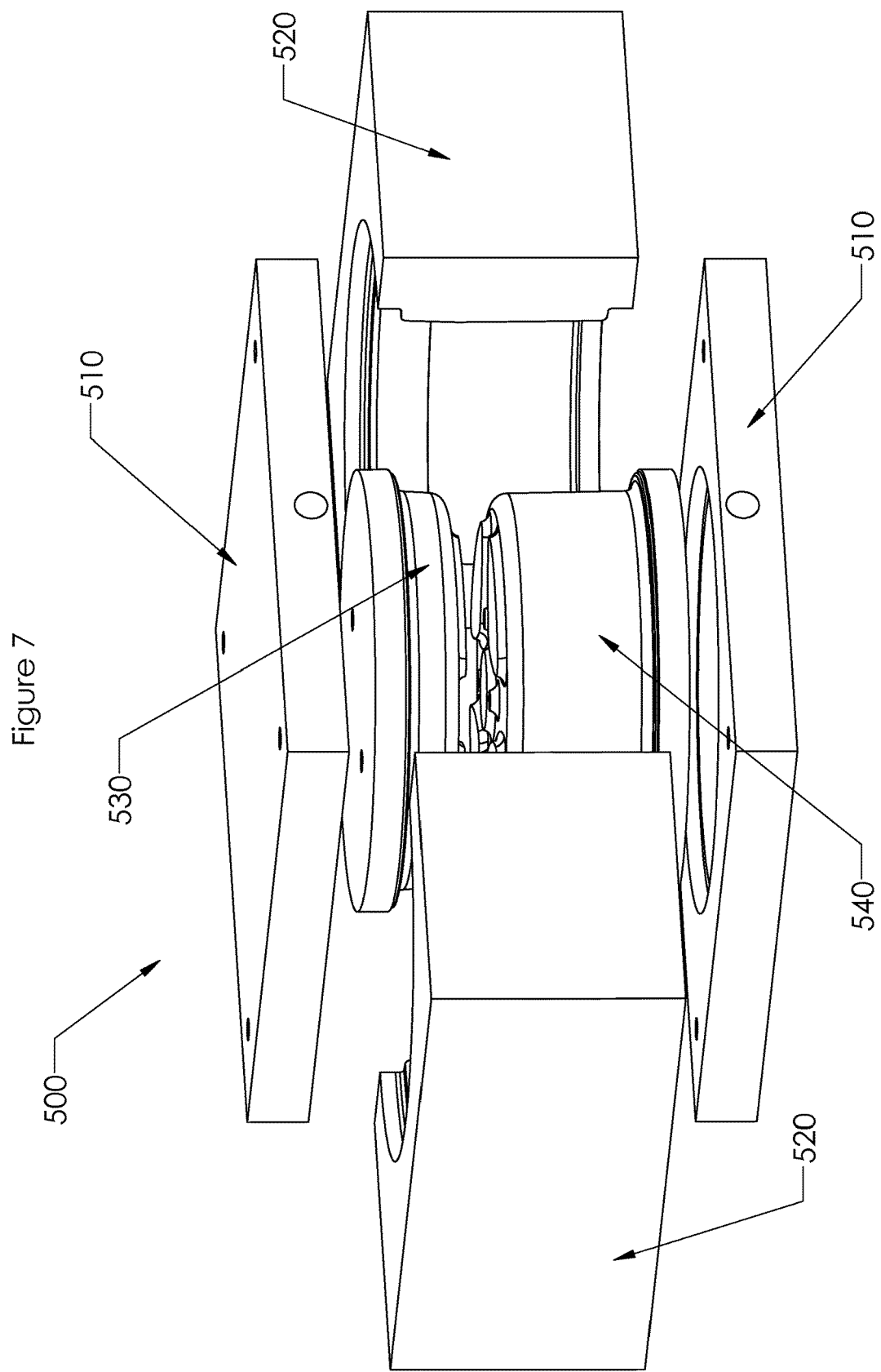
FIG. 7 is an exploded perspective view of an exemplary mold.
Figure 8:
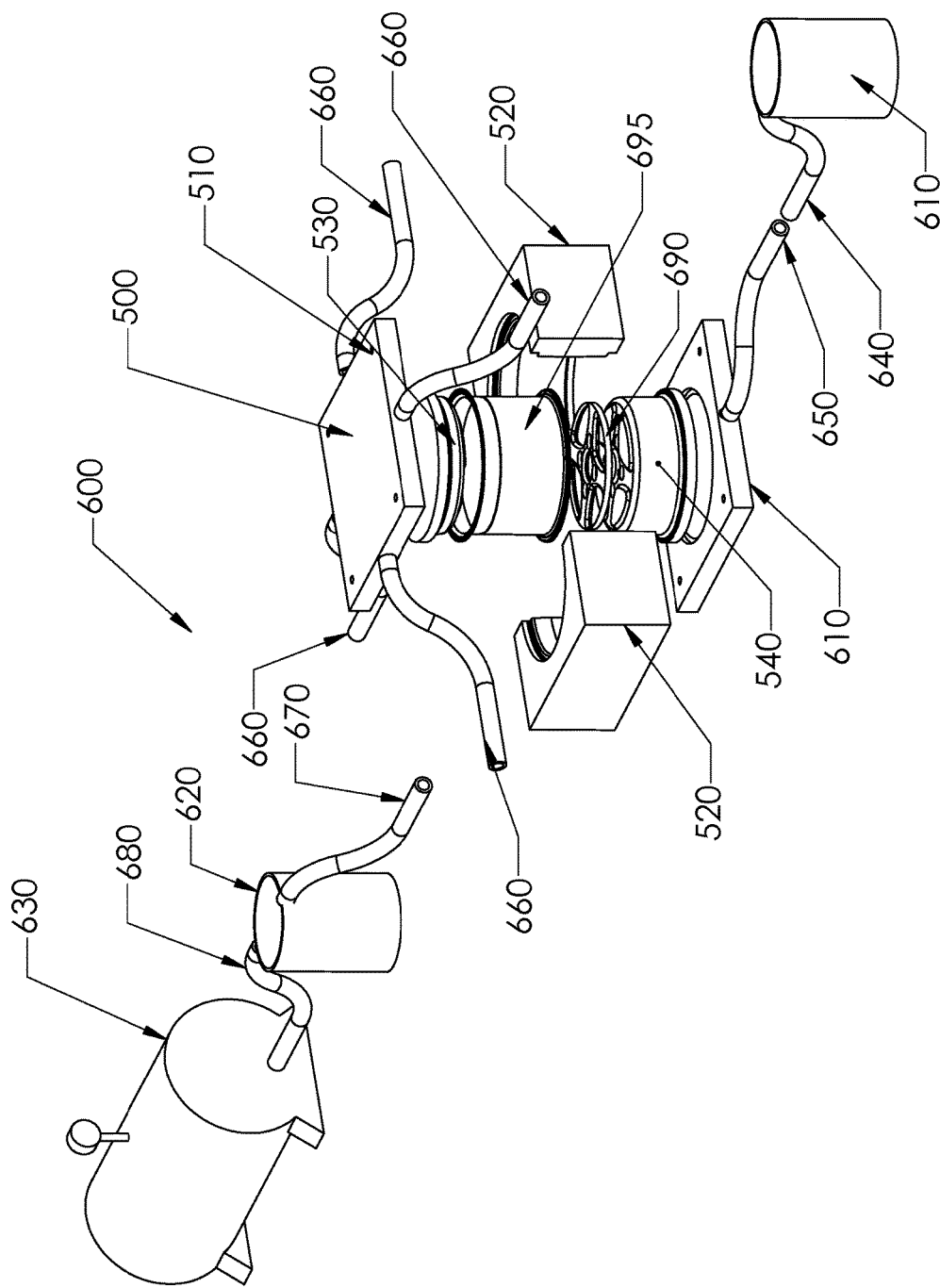
FIG. 8 illustrates is a perspective view of an exemplary manufacturing apparatus.

FIGS. 7 and 8 depict exemplary methods of forming a composite wheel of the present invention. In FIG. 7, an embodiment of a mold 500 is shown in an exploded view. Mold 500 includes base plate molds 510, side molds 520, outside mold 530, and inside mold 540. Outside mold 530 is a female mold tor the "street" side of the wheel, while inside mold 540 is a female mold for the "drum" side of the wheel. Outside mold 530 and inside mold 540 provide forms to shape the features of the desired finished wheel design. Base plate molds 510 and side molds 520 provide an enclosed structure in which 10 infuse resin. The parts of mold 500 may be fabricated from typical mold materials such as aluminum, wood, steel, foam, or composites.

FIG. 8 shows an exemplary manufacturing system 600 in which mold 500 may be used. In addition to components of mold 500, system 600 comprises resin source 610, resin reservoir 620, vacuum pump 630, resin feeding tubing 640, inline resin tubing 650, exit resin tubing 660, resin reservoir inline 670, and vacuum tubing 680. Also shown in FIG. 8 is disc core 690 and optional rim core 695, to be embedded inside a wheel. In embodiments where a rim core is not utilized, only a disc core 690 is placed in the mold 500, and fibers are layered on the disc core 690 to embed the disc core as well as to form a rim portion of the wheel. In other embodiments where the disc core 690 and rim core 695 are integrally one piece, the single disc/rim core would be placed in mold 500. In various embodiments the composite fibers may be laid over the disc and/or rim cores prior to be placing in the mold, after being placed in the mold, or a combination thereof. Base plate mold 510 is the base of the closed mold and is joined to the resin feeding tubing 640 or exit resin tubing 660, and to the rest of the pieces of the closed mold. Vacuum pump 630 is used to infuse resin from resin source 610 into the system at the necessary pressure. Resin reservoir 620 is connected to the vacuum pump 630 and collects excess resin from the system 600. The purpose of the reservoir 620 is to prevent resin from reaching the vacuum pump 630 and damaging it.

In operation, the outside mold 530 and inside mold 540 may first be coated with release agent. The disc core 690 and optional rim core 695 are sandwiched between layers of composite fiber such as carbon fiber, aramid, or fiberglass, and placed between outside mold 530 and inside mold 540. As described previously, disc core 690 may be integral with the rim core 695, or the rim core 695 may be a separate piece and be comprised itself of separate components such as a bead seat insert. In an embodiment where the disc and rim cores are not integral with each other, rim core 695 is placed around disc core 690 to surround the circumference of disc core 690. Additional layers of composite fiber are wrapped around the sandwiched core and around the forms of outside mold 530 and of inside 540, thereby embedding the core and forming the desired shape of the wheel as a single piece. Multiple layers of composite fiber may be laid in varying orientations to add strength to the wheel. Vacuum may be applied while laying the fibers to assist, in conforming the layers to the details of the molds. Alignment fixtures may be used to ensure concentricity between the various mold components. The mold is then sealed from all directions, resin is pumped into the mold, and excess resin is subsequently removed. Possible resins include but are not limited to thermosetting resins such as epoxy, polyester, and vinylester. The material in the mold is allowed to cure under conditions appropriate for the particular resin. The caring process can be accelerated using heat such as in an oven or an autoclave. The wheel is then removed from the mold, trimmed, sanded, clear-coated, and lug nut inserts added if applicable.

Note that variations on the molds and apparatus of FIGS. 7 and 8 are possible for producing the composite wheel of the present invention. For instance, the base plates and side molds may be replaced by different configurations of mold enclosures as known in the art. Alternate resin pump and tubing equipment as used in the industry may be substituted for the system 600 of FIG. 8. The rim cores and disc cores may be wrapped with composite fiber individually prior to being placed into the mold, and then wrapped with more fiber layers so that the disc and rim sections of the wheel are formed integrally with each other. Furthermore, although the disclosure describes wheels on which a tire will be mounted, the invention may also be applied to non-pneumatic wheels.

While the specification has been described in detail with respect to specific embodiments of the invention, it will be appreciated, that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention. Thus, it is intended that the present subject matter covers such modifications and variations as come within the scope of the appended claims and their equivalents.

What is claimed is:

1. A one-piece composite wheel, comprising:
a disc core comprising a three-dimensionally reinforced honeycomb material, wherein the disc core is embedded by only a fiber-resin composite material to form a disc;
a rim comprising the fiber-resin composite material, a first bead seat, a second bead seat, and a drop center that embeds the disc core and spans between the first bead seat and the second bead seat, wherein the fiber-resin composite material forms an entirety of the rim and embeds the disc core such that the rim is integral with the disc.

2. The wheel of claim 1 wherein the reinforced honeycomb material comprises aluminum.

3. The wheel of claim 1 wherein the fiber-resin composite material comprises carbon fibers.

4. The wheel of claim 1, wherein the drop center is recessed.

5. The wheel of claim 1, wherein the disc core has spokes.

6. The wheel of claim 1, wherein the disc core comprises through holes for fasteners.

7. The wheel of claim 1, wherein the disc core comprises an axle hole through a hub section.

8. The wheel of claim 1, wherein the three-dimensionally reinforced honeycomb material comprises a honeycomb structure providing load resistance in a first axis, and crossbeams providing load resistance in a plane perpendicular to the first axis.

9. The wheel of claim 1, wherein the fiber-resin composite material consists essentially of a fiber-reinforced material layered over the disc core and that forms the rim.

10. The wheel of claim 9, wherein the fiber-reinforced material comprises carbon fibers.

11. The wheel of claim 10 wherein the fiber-reinforced material is the only material that embeds the disc core.

12. The wheel of claim 9, wherein the fiber-reinforced material comprises glass fibers.

13. The wheel of claim 9, wherein the fiber-reinforced material comprises aramid fibers.

14. The wheel of claim 1, wherein the fiber-resin composite material comprises a rim core made of the three-dimensionally reinforced honeycomb material.

15. The wheel of claim 14, wherein the rim core and the disc core are layered together as one unit with the fiber-resin composite material.

16. The wheel of claim 14, wherein the rim core and the disc core are each individually layered with the fiber-resin composite material.

17. The wheel of claim 14, wherein the rim core comprises a flat rim area component interposed between opposing bead seat area components.

18. The wheel of claim 17, wherein the opposing bead seat area components are symmetrical.

19. The wheel of claim 17, wherein the flat rim area component and disc core are integral with one another.

* * * * *